(12) United States Patent
Sebire

(10) Patent No.: US 6,870,821 B2
(45) Date of Patent: Mar. 22, 2005

(54) FLEXIBLE LAYER OVERLAY FOR SEAMLESS HANDOVERS BETWEEN FULL RATE AND HALF RATE CHANNELS

(75) Inventor: Benoist P. Sebire, Espoo (FI)

(73) Assignee: Nokia Corporation, Espoo (FI)

(*) Notice: Subject to any disclaimer, the term of this patent is extended or adjusted under 35 U.S.C. 154(b) by 25 days.

(21) Appl. No.: 10/354,827

(22) Filed: Jan. 30, 2003

(65) Prior Publication Data

US 2004/0152468 A1 Aug. 5, 2004

(51) Int. Cl.$^7$ ................................................ H04Q 7/00
(52) U.S. Cl. ......................... 370/328; 455/422; 455/511
(58) Field of Search ................................. 370/310, 328, 370/331, 337, 342; 455/403, 422, 436, 439, 442, 450, 511

(56) References Cited

U.S. PATENT DOCUMENTS

| | | | | |
|---|---|---|---|---|
| 5,182,753 A | * | 1/1993 | Dahlin et al. ................ | 714/749 |
| 5,859,843 A | | 1/1999 | Honkasalo et al. | |
| 6,084,865 A | * | 7/2000 | Dent ............................ | 370/321 |
| 6,154,457 A | | 11/2000 | Vayrynen | |
| 6,198,748 B1 | * | 3/2001 | Bruckert ...................... | 370/432 |
| 6,275,480 B1 | * | 8/2001 | Schreier ...................... | 370/321 |
| 6,285,888 B1 | | 9/2001 | Ostman | |
| 6,286,122 B1 | | 9/2001 | Alanara | |
| 6,430,417 B1 | * | 8/2002 | Raith et al. .................. | 455/466 |
| 6,452,941 B1 | * | 9/2002 | Bruhn .......................... | 370/468 |
| 6,466,789 B1 | | 10/2002 | Bruhn et al. | |
| 2003/0126539 A1 | * | 7/2003 | Bysted et al. ............... | 714/758 |

OTHER PUBLICATIONS

"3$^{rd}$ Generation Partnership Project; Technical Specification Group GSM/EDGE Radio Access Network; Flexible Layer One; (Release 6)", 3 GPP TR 45.902 V0.3.0 (Nov. 2002).

"3$^{rd}$ Generation Partnership Project; Technical Specification Group GSM/EDGE Radio Access Network; Channel Coding (Release 4)", 3 GPP TS 45.003 V4.1.0 (Nov. 2001).

"3$^{rd}$ Generation Partnership Project; Technical Specification Group GERAN; GSM/EDGE Radio Access Network (GERNAN); Overall Description—Stage 2; (Release 4)", 3 GPP TS 43:051 V4.0.0 (Nov. 2000).

"3$^{rd}$ Generation Partnership Project (3GPP); Technical Specification Group (TSG) Radio Access Network (RAN); Working Group 1 (WGI); Physical Layer—Generation description", TS 25.201 V2.3.0 (Oct. 1999).

* cited by examiner

*Primary Examiner*—John Pezzlo
*Assistant Examiner*—Dmitry Levitan
(74) *Attorney, Agent, or Firm*—Harrington & Smith, LLP

(57) ABSTRACT

A Method and system for transmitting a signaling message between a base station and a mobile station over a half rate channel are shown. Traffic data is interleaved over k bursts diagonally (4 bursts diagonally in GERAN) and a signaling message is interleaved over m bursts diagonally, where m>k. The method includes transmitting the same encoded signaling message in two consecutive radio packets, where each radio packet is interleaved over k bursts diagonally (the consecutive radio packets have an interleaving depth of 6 in GERAN). By doing so the coded bits of the signaling message are effectively interleaved over two radio packets, and m>k. The receive side of the communication reads the first packet, stores the soft values for decoding, and soft combines them when the second radio packet is received. Diversity may be added by the transmit side. The re-transmission of the second radio packet is preferably mandatory at call set-up.

19 Claims, 8 Drawing Sheets

| FIG. 3A |
|---------|
| FIG. 3B |

| 0 | 1 | 2 | 3 | ... | | | | | | | | | | | frame number |
|---|---|---|---|---|---|---|---|---|---|---|---|---|---|---|---|
| 1 | 1 | 1 | 1 | F | F | F | F | 3 | 3 | 3 | 3 | 4 | 4 | 4 | 4 |
| 0 | 0 | 0 | 0 | 1 | 1 | 1 | 1 | F | F | F | F | 3 | 3 | 3 | 3 |

FACCH/F

FIG.4
PRIOR ART

| 0 | 2 | 4 | 6 | ... | | | | | | frame number |
|---|---|---|---|---|---|---|---|---|---|---|
| 1 | 1 | F | F | F | F | 4 | 4 | 5 | 5 |
| 0 | 0 | 1 | 1 | F | F | F | F | 4 | 4 |

FACCH/H

FIG.5

FLEXIBLE LAYER OVERLAY FOR SEAMLESS HANDOVERS BETWEEN FULL RATE AND HALF RATE CHANNELS

TECHNICAL FIELD

These teachings relate generally to methods for enabling mobile communication systems. It is particularly directed to enabling handovers between full data rate channels and half data rate channels of a cellular telecommunications system, and is most particularly directed to the physical layer of a radio access network such as GSM/EDGE.

BACKGROUND

A long established trend in mobile communications is to squeeze increasing amounts of data over a fixed bandwidth. Voice and multimedia services (i.e.: session initiation and description, real-time transport, and eventually hypertext transport and real-time streaming video) are now available to users of third generation (3G) mobile devices through Internet Protocol Multimedia Subsystem (IMS) architecture. IMS is specified by the industry consortium Third Generation Partnership Project (3GPP) as part of the Global System for Mobile Communication/Enhanced Data Rates for Global Evolution (GSM/EDGE or GERAN) standard. IMS has the potential to greatly increase the demand for higher volumes of data flowing over GERAN.

Mobile systems such as those employing the GSM standard facilitate transmissions in quanta of 'frames', wherein the frame size and time are fixed but the data rate within a frame may vary. Each transmission frame is divided into eight multiplexed channels. For full rate (FR) channels, one slot every frame is used. For half rate (HR) channels, one slot every second frame is used. Each TDMA frame allows 8 full rate users or 16 half rate users to be multiplexed. Switching between FR and HR occurs frequently, and allows bandwidth to be used efficiently. For example, when the volume of transmissions within the 'cell' of a base station is high, the base station may convert certain transmissions to HR channels in order that the wireless connections of all current users remain uninterrupted. Once traffic volume within the cell subsides, the base station may then allow full rate transmissions for all current users. HR channels may be switched to FR channels when a user is moving between cells and the connection is being handed over from one base station to another. Additionally, data-intensive portions of a wireless transmission, such as high quality voice transmissions or graphical interface downloads, may require FR channels. Other less data-intensive portions may be switched automatically to HR channels without any loss in quality.

Data flows between the physical layer (layer 1) and the medium access control layer (MAC or layer 2) along logical channels, which are divided into traffic channels and control channels. Logical channels are multiplexed by the MAC on physical subchannels, which are units of the radio medium. Traffic channels of the type TCH are intended to carry encoded speech and user data, while control channels carry signaling and synchronization data. The TCH use a circuit-like connection over the radio interface, and can be modulated either by Gaussian Minimum Phase Shifting (GMSK) or 8-Phase Shift Keying (8-PSK). One main characteristic of the channel coding for the TCH is the use of diagonal interleaving.

Both traffic and control channels may change between half rate and full rate channels. Any time there is a change, both the base station and the mobile station must do so quickly and in concert with one another in order to ensure bandwidth is available where it is needed (i.e.: graphical or streaming downlinks, new users in a cell initiating a cellular connection) and not wasted (i.e.: using full rate channels for typical voice transmissions). Switching between full and half rate entails a risk of dropped or delayed connections, which must be kept to a minimum. There is a current proposal to employ a flexible layer overlay (Flexible Layer One, or FLO) in release 6 of GERAN that is to be used in conjunction with the physical layer to interface with the medium access control (see 3GPP TR 45.902, herein incorporated in its entirety). However, because the interleaving diagonal depth differs between full rate and half rate channels, the proposed standard is not compatible with half rate signaling. What is needed in the art is an improved method of switching between full rate and half rate transmissions, especially one consistent with the GERAN standard to better enable IMS. It is preferable that such an improved method operate within the proposed FLO rather than require an entirely new standard. The present invention is directed to such an improved method. Further background may be found at 3GPP TS 43.051 ("Overall Description—Stage 2") and 3GPP TS 45.003 ("Channel Coding"), each from GERAN release 4.

SUMMARY OF THE PREFERRED EMBODIMENTS

The foregoing and other problems are overcome, and other advantages are realized, in accordance with the presently preferred embodiments of these teachings.

The present invention is in one aspect a method for transmitting a signaling message between a base station and a mobile station over a half rate channel. For a full rate channel, traffic data and a signaling message are both interleaved over n bursts diagonally (8 bursts diagonally in GSM/EDGE). For a half rate channel, the traffic data is interleaved over k bursts diagonally (4 bursts diagonally in GSM/EDGE, where k=n/2 in the proposed FLO standard but not in the present invention. The method includes transmitting over k diagonally interleaved bursts on the half-rate channel the encoded message in a first and a subsequent second radio packet. The first and second radio packets are interleaved with one another over m bursts where m is greater than k. By doing so the coded bits of the signaling message are effectively interleaved over two radio packets.

In another aspect, the present invention is a method for decoding a signaling message that is within a radio packet, and the radio packet also includes a transport format combination identifier TFCI. The method includes receiving a first radio packet over a physical channel at a half rate, and then determining, based on the TFCI of that first radio packet, that a second radio packet carrying the same signaling message has been sent. In the method, a first set of values for decoding the signaling message of the first radio packet are determined and stored. Decoding of the signaling message may be incomplete at this point. The second radio packet is received over the channel at a half rate, where the second radio packet is interleaved with the first radio packet. A second set of values for decoding the signaling message of the second radio packet are determined and combined with the first set of values and the signaling message, which is identical in the first and second radio packets if sent with the method for transmitting noted above, is decoded using both sets of values.

The present invention further includes a wireless telecommunications system. As known the art, the system includes circuitry for transmitting a signaling message between a base station and a mobile station over a half rate channel. For a full rate channel, traffic data and a signaling message are both interleaved over n bursts diagonally (8 bursts diagonally in GSM/EDGE). For a half rate channel, the traffic data is interleaved over k bursts diagonally (4 bursts diagonally in GSM/EDGE), and in the prior art, k=n/2. According to the present invention, the system includes a transmitter for transmitting an encoded signaling message over a half rate channel in each of a first and a consecutive second radio packet, where each radio packet is interleaved over k bursts diagonally and the first and second radio packets are interleaved with one another over m>k bursts diagonally. The system also includes a receiver for receiving a first and a consecutive second radio packet. The receiver has a decoder to determine a first and second set of values for decoding the signaling message in the respective first and second radio packets and to decode the signaling message using a combination of the first and second sets of values. The receiver also has a memory for storing at least the first set of values.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4 is a prior art block diagram depicting how a FACCH is transmitted on full rate channels, wherein the interleave is eight bursts diagonal.

FIG. 5 is a block diagram depicting how a FACCH is transmitted on half rate channels in accordance with the present invention, wherein the interleave is six bursts diagonal.

DETAILED DESCRIPTION OF THE PREFERRED EMBODIMENTS

The invention will now be described by way of example, with reference to the accompanying drawings listed above.

Figure 1:
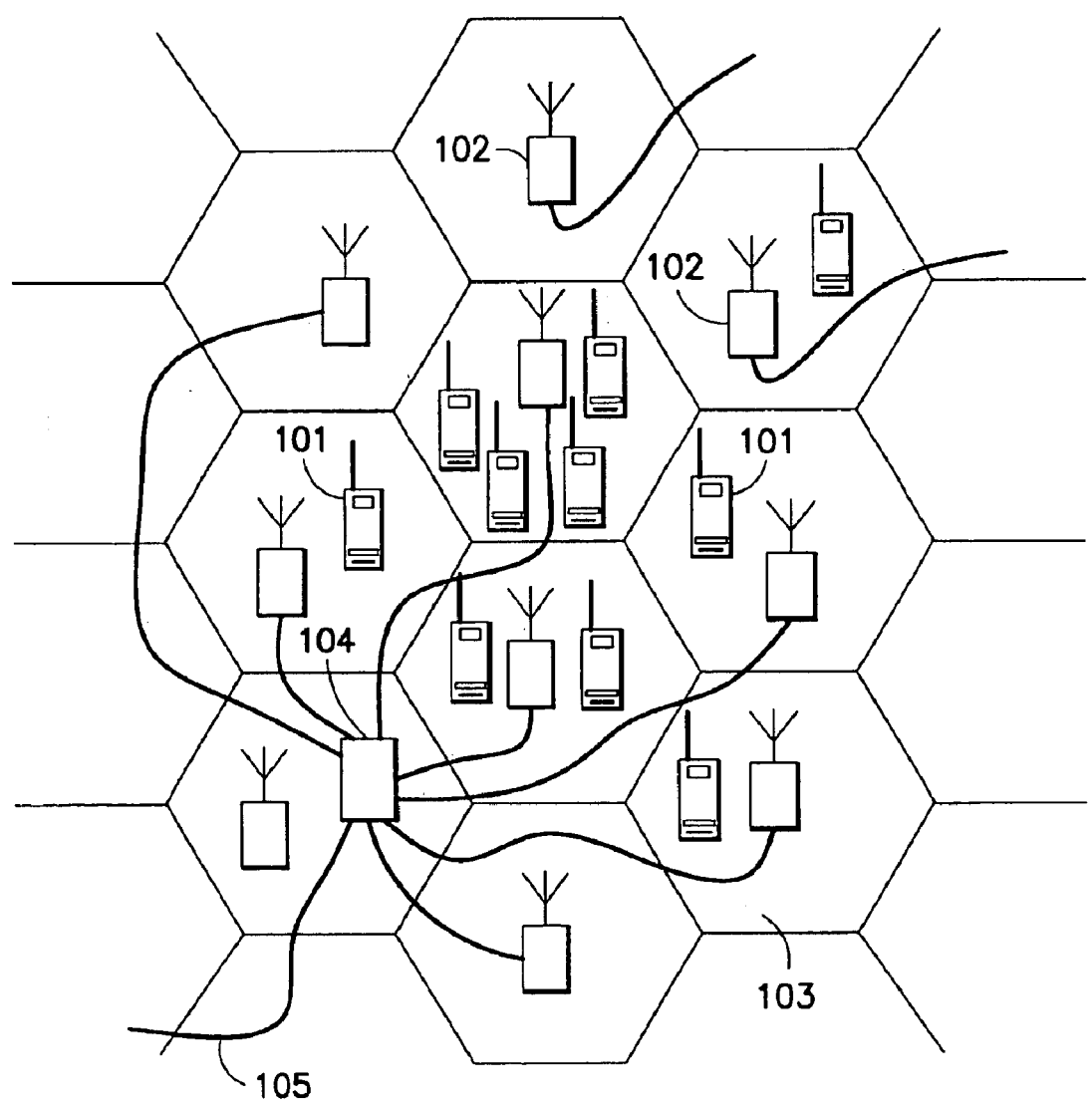
FIG. 1 illustrates as mobile network having a plurality of cells and a base station in each of the cells, wherein the base stations are arranged to communicate with mobile stations when the mobile stations are within the region covered by the cells.

A cellular mobile radio system is shown in FIG. 1, wherein mobile stations 101 communicate with base stations 102. Communications between a mobile station 101 and the base station 102 is performed in accordance with the GSM standard. Generally, protocols are established such that a mobile station 101 will communicate with the base station 102 which provides the best signal transmission path, usually identified by measuring relative signal strengths. These assessments of signal strengths result in a geographical area being divided into a plurality of cells 103. Due to variations in terrain, atmospheric conditions, and the presence of man-made objects, the cells 103 generally are not uniform as depicted in FIG. 1.

The base stations communicate with a switching center 104, which are in turn arranged to interconnect the base stations and provide access, via trunks 105, to other switched networks, such as a public switched telephone network and an integrated digital services network.

The mobile stations are arranged to operate at a normal rate of data transfer in which a transmission frame is divided into, for example, eight multiplexed channels, with one of these channels being used for transmission and another frequency displaced channel being used for reception during each frame period. In addition, the base stations and some of the mobile stations are configured to operate at half-rate, which is a transmission rate that results in the total data transfer rate being reduced by one half as compared to the normal or full rate mode of operation. This allows more users and a greater volume of data to be transferred over existing networks by reducing the amount of unused bandwidth at any given time. The present invention is directed to increasing the efficient use of available bandwidth so that more customers and/or more volumes of data may be transmitted while retaining quality of service (e.g., not inadvertently disconnecting a cellular link, minimal delays in uplinks and downlinks, etc.).

Anytime there is to be a changeover between full rate and half rate, the base and mobile stations coordinate the changeover by signaling one another exactly when the changeover is to occur. The proposed standard (3GPP TR 45.902) adds a flexible layer overlay known as flexible layer one, hereinafter FLO, to the physical layer of the network architecture. Digital signal processors (DSPs) or application specific integrated circuits are often provided with randomly accessible memory locations that are fast enough to supply instructions to the DSP at the processor's normal operating rate. To keep the size of the RAM from becoming overly burdensome, a technique has been developed that replaces a first set of memory instructions with a second set of memory instructions. This technique is known as an overlay, and substantially increases the speed and capability of DSPs without the need to add significantly greater RAM capability.

Figure 2:
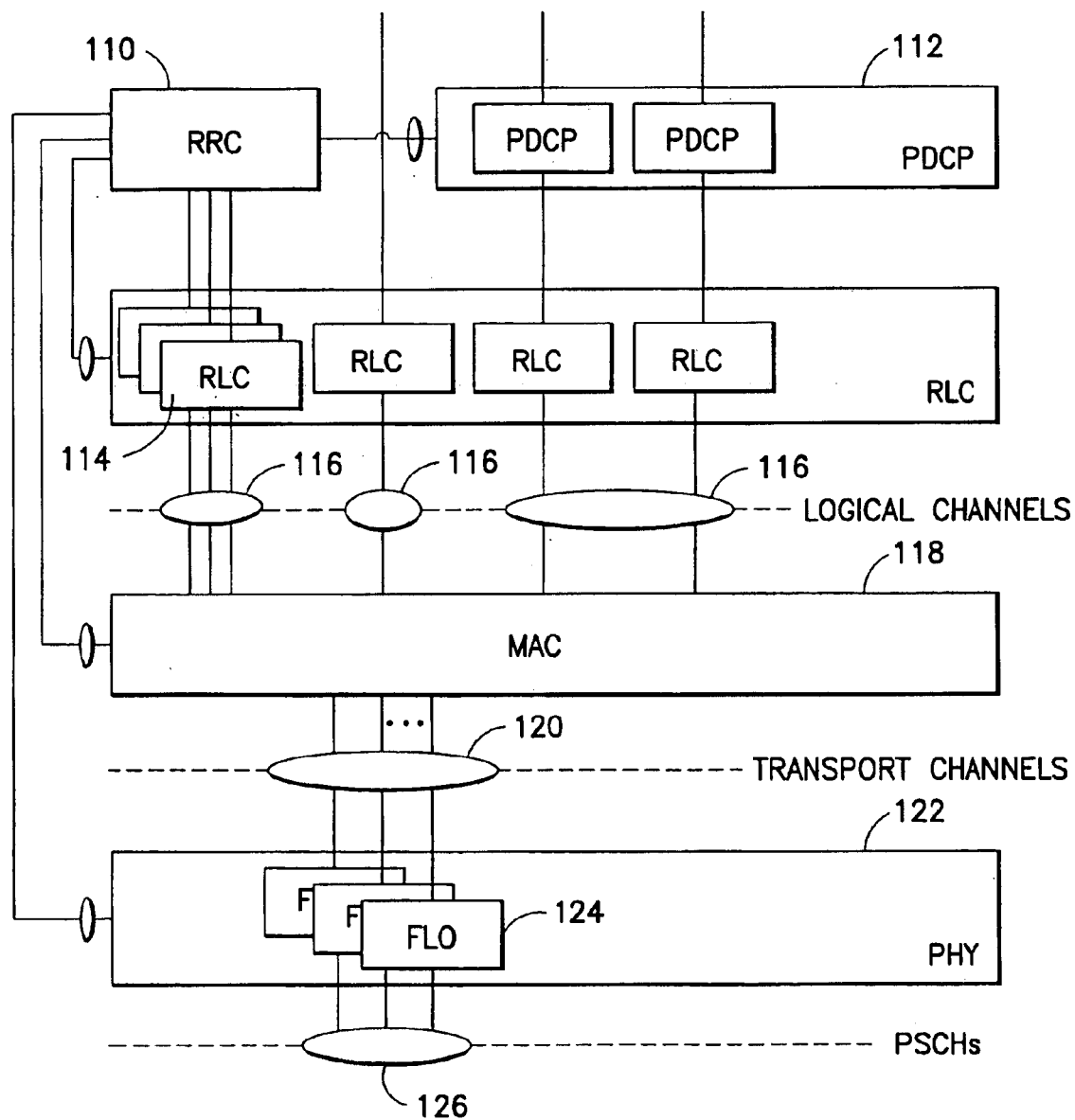
FIG. 2 is a prior art block diagram depicting protocol architecture of the proposed Flexible Layer One in relation to GERAN architecture in Iu mode.

FIG. 2 shows how an FLO in accordance with the current invention works in conjunction with the mobile communications network. The radio resource center (RRC) 110, packet data convergence protocol (PDCP) 112, radio link control (RLC) 114 are as known in the art and communicate with a medium access control (MAC) 118 via logical channels 116. The MAC is also known as layer 2, and communicates through transport channels (TCH or TrCH) 120 with the physical layer (PHY) 122, also known as layer 1. Communication through the TCHs 120 is filtered through the flexible layer one (FLO) 124 of the present invention to better enable switching between full rate and half rate channels (or between full rate and anything other than full rate channels). Further communications between the physical layer 122 and any physical sub-channels (PSCHs) 126 is also filtered through FLO 124.

For seamless handovers between full rate and half rate channels, the link level performance of associated signalling must be similar on these two channel modes. Consequently the coding rate of associated signaling (between the base station and the mobile station) on half rate channels must be similar to the coding rate of associated signalling on full rate channels. This is achieved in GSM/EDGE by increasing the interleaving depth of a fast associated control channel (FACCH) on half rate channels to be twice the interleaving depth of a transport channel at half rate (TCH/H). Interleaving is the practice of sending portions of a single data block over several discrete frames of divided data.

Data is transmitted over a mobile network in frames. Each frame is divided, for example, into eight slots (for example, slots numbered 0–7), each slot belonging to one specific channel. A full rate channel will use one slot per frame in each direction (uplink or downlink), equally spaced from each other, whereas a half rate channel uses only one slot per every other frame. Speech from one mobile station user to another may be transferred and broken into multiple speech blocks. Specifically, on FR channels, one speech frame is coded and coded bits are diagonally interleaved over 8 bursts using the even numbered bits of the first 4 bursts and odd numbered bits of the last 4 bursts (see 3GPP TS 45.003). On HR channels, one speech frame is coded and coded bits are diagonally interleaved over 4 bursts using the even numbered bits of the first 2 bursts and odd numbered bits of the last 2 bursts (see 3GPP TS 45.003).

A FACCH is a signaling channel for transmission and control of supervisory messages between the base station 102 and the mobile station 101. The FACCH, by definition in the GSM standard, replaces the speech blocks (i.e.: DATA blocks) whenever the mobile network deems it appropriate to do so (i.e.: to switch low quality transmissions to half rate when the cell 103 begins to get crowded, to switch a user's connection to a full rate as signal strength dips below a threshold and the user is being passes to an adjacent cell). Thus the FACCH is a blank and burst channel. On FR channels, the FACCH blanks one speech frame (interleaving is the same), whereas on HR channels, the FACCH blanks two speech frames (interleaving is double). As described below, this interleaving depth may vary in the diagonal direction (i.e.: across channels and frames).

Figures 3, 3A:
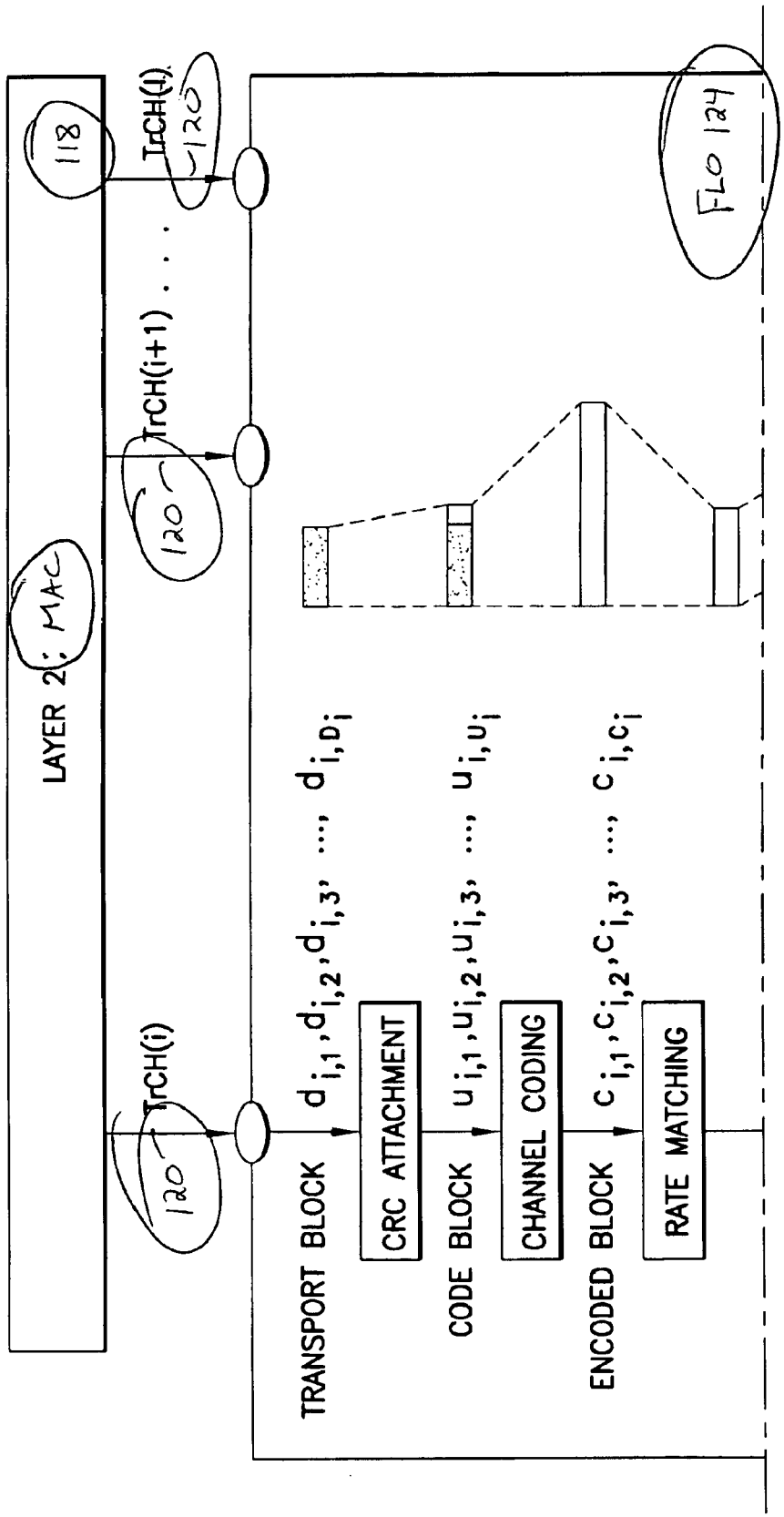
FIG. 3 is a prior art block diagram depicting architecture of the proposed Flexible Layer One in accordance with 3GPP TR 45.902.
Figure 3B:
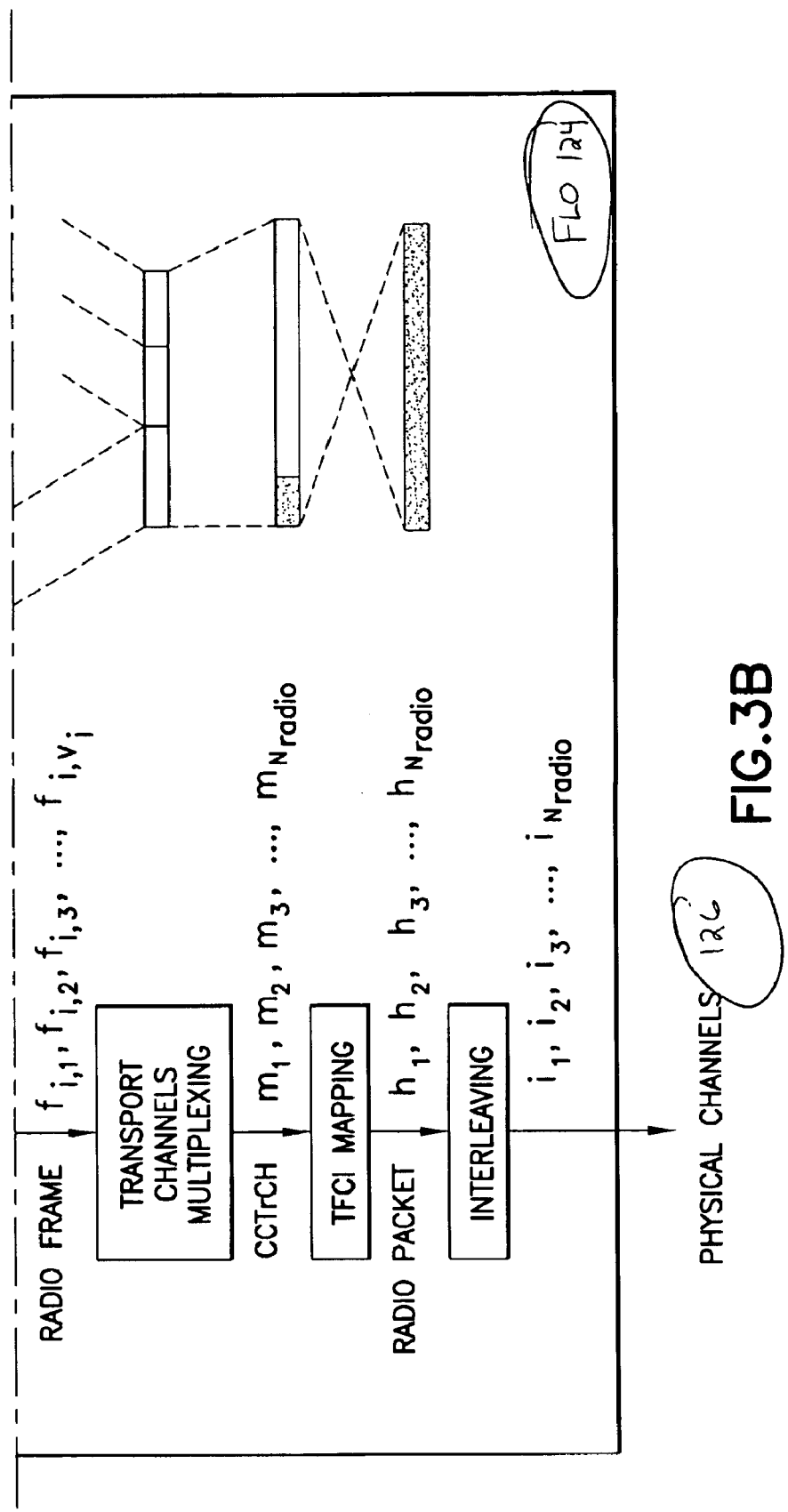

The one-step interleaving architecture FLO that is depicted at FIG. 3 (from 3GPP TR 45.902) is predicated on all transport channels on one basic physical channel having the same interleaving depth. Therefore it is not possible to use the same principle as described above for HR channels. Nevertheless, the coding rate of associated signaling must be the similar on FR and HR channels in order to support HR channels.

FIG. 3 depicts protocol architecture of the flexible layer overlay (FLO) for a one-layer interleaving in Iu mode. The MAC is responsible for mapping logical channels on appropriate transport channels. A logical channel type is selected on the plane to which the radio link control (RLC) entity belongs. Two new channel types are introduced for use with FLO. A FLO dedicated traffic channel (FDTCH) is a point-to-point channel dedicated to one mobile station (MS, such as a cellular phone terminal) for the transfer of user-plane information only. An FDTCH can exist in the uplink (MS to base station) or downlink (base station to MS) directions. A FLO dedicated control channel (FDCCH) is a point-to-point channel dedicated to one MS used in uplink or downlink directions and carries control-plane information only between an MS and the base station. A MS may have one or more dedicated transport channels active at the same time. A detailed description of FIG. 3 may be found at 3GPP TR 45.902.

CRC Attachment:

In reference to FIG. 3, a cyclic redundancy check (CRC) is added to each transport block. The CRC is designated as $d_{i,1}, d_{i,2}, d_{i,3}, \ldots d_{i,Di}$. The size of the CRC to be used is fixed on each transport channel and is configured by layer 3 (semi-static attribute of the transport format). Code blocks, designated as $u_{i,1}, u_{i,2}, u_{i,3}, \ldots u_{i,Ui}$, are then output from the CRC attachment. The entire transport block is used to calculate the parity bits. The parity bits are generated by one of the following cyclic generator polynomials and appended to the transport block:

$$gCRC18(D)=D^{18}+D^{17}+D^{14}+D^{13}+D^{11}+D^{10}+D^8+D^7+D^6+D^3+D^2+1;$$

$$gCRC12(D)=D^{12}+D^{11}+D^{10}+D^8+D^5+D^4+1;$$

$$gCRC6(D)=D^6+D^5+D^3+D^2+D+1.$$

The resulting upper limits for then residual bit error rate (RBER) satisfy the quality of service (QoS) requirements specified in 3GPP 23.107.

Channel Coding:

After CRC attachment, the code blocks are processed through channel coding to produce encoded blocks, designated as $c_{i,1}, c_{i,2}, c_{i,3}, \ldots c_{i,Ci}$. The channel coding to be used is chosen by layer 3 and preferably can only be changed through higher layer signaling (semi-static attribute of the transport format). Preferably, only one type of coding is used, the same 1/3 convolutional code of constraint length 7 as in the enhanced general packet radio service standard (EGPRS, see 3GPP TS 45.003). This coding is defined by the following polynomials:

$$G4=1+D^2+D^3+D^5+D^6;$$

$$G7=1+D+D^2+D^3+D^6;$$

$$G5=1+D+D^4+D^6.$$

Rate Matching:

In rate matching, the bits of an encoded block on a transport channel are repeated or punctured. Since the block size is a dynamic attribute, the number of bits on a transport channel can vary between different transmission times. When it happens, bits are repeated or punctured to ensure that the total bit rate after multiplexing of the transport channel is identical to the total channel bit rate of the allocated physical channel.

When only one transport channel is active at a time, the coding rate depends only on the transport block size and on the available channel bandwidth. When more than one transport channel is active, the coding rate also depends upon the rate matching attributes associated to each transport channel. The rate matching attribute is used when the number of bits to be repeated or punctured for each transport channel is calculated.

Higher layers assign the rate matching attribute for each transport channel. This attribute is semi-static and can preferably be changed only through higher level signaling. The rate matching attributes determine priorities between the coded bits of different transport channels. Higher rate matching attributes indicate higher priority to the coded bits. The coding rate of the transport channels can be adjusted by setting different rate matching attributes to each transport channel.

Output from rate matching is referred to as radio frames, designated as $f_{i,1}, f_{i,2}, f_{i,3}, \ldots f_{i,Vi}$. For every radio packet, the rate matching produces one radio frame per encoded block (i.e.: per transport channel).

The rate matching algorithm for GERAN is based on UTRAN, specified at 3GPP TS 25.212. Several of the UTRAN parameters are set to either 0 or 1 since in this FLO there is no spreading factor, compressed mode, or special cases such as turbo codes. The following notation is used in the algorithm:

$\lfloor x \rfloor$ Round x towards $-\infty$, i.e.: integer such that $x-1 < \lfloor x \rfloor \leq x$.

$|x|$ Absolute value of x.

I Number of TrCHs in the coded composite transport channel (CCTrCH).

$N_{data}$ Total number of bits that are available in a radio packet for the CCTrCH.

$N_{i,j}$ Number of bits in an encoded block before rata matching on TrCH i with transport format combination j.

$\Delta N_{i,j}$ If positive, $\Delta N_{i,j}$ denotes the number of bits that have to be repeated in an encoded block on TrCH i with transport combination j in order to produce a radio frame.

If negative, $\Delta N_{i,j}$ denotes the number of bits that have to be punctured in an encoded block on TrCH i with transport combination j in order to produce a radio frame.

If null, no bits have to be punctured or repeated (i.e.: the rate matching is transparent and the content of the radio frame is identical to the content of the encoded block on TrCH i with transport format combination j.

$RM_i$ Semi static rate matching attribute for transport channel i.

$e_{ini}$ Initial value of variable e in the rate matching pattern determination algorithm.

$e_{plus}$ Increment of variable e in the rate matching pattern determination algorithm.

$e_{minus}$ Decrement of variable e in the rate matching pattern determination algorithm.

$Z_{ij}$ Intermediate calculation value.

For each radio packet using transport format combination j, the number of bits to be repeated or punctured $\Delta N_{i,j}$ within one encoded block for each transport channel i is calculated with one of the following equations:

$$Z_{ij} = \left\lfloor \frac{\sum_{m=1}^{i}(RM_m \times N_{m,j}) \times N_{data}}{\sum_{m=1}^{I}(RM_m \times N_{m,j})} \right\rfloor$$

for all i=1 ... I.

$\Delta N_{i,j} = Z_{i,j} - Z_{i-1,j} - N_{i,j}$ for all i=1 ... I.

For the calculation of the rate matching pattern of each transport channel i, the following calculations are defined:

$e_{ini}=1$.

$e_{plus}=2 \times N_{i,j}$ $e_{minus}=2 \times |N_{i,j}|$

The rate matching rule is as follows:
if $\Delta N_{i,j} < 0$ puncturing is to be performed;
   $e=e_{ini}$, initial error between current and desired puncturing ratio
   m=1 index of current bit
   do while $m \leq N_{i,j}$ for each bit of encoded block TrCH i
     $e=e-e_{minus}$ update error
     if e<0 then check if bit number m should be punctured
        puncture bit $b_{im}$ bit is punctured
        $e=e+e_{plus}$, update error
     end if
     m=m+1 next bit
   else do
else if $\Delta N_{i,j} > 0$ repetition is to be performed
   $e=e_{ini}$, initial error between current and desired puncturing ratio
   m=1 index of current bit
   do while $m \leq N_{i,j}$ for each bit of encoded block TrCH i
     $e=e-e_{minus}$ update error
     do while $e \leq 0$ check if bit number m should be repeated
        repeat bit $b_{im}$ repeat bit
        $e=e+e_{plus}$, update error
     end do
     m=m+1 next bit
   end do
else
   do nothing
end if Transport Channel Multiplexing:

For every radio packet to be transmitted, one radio frame from each active transport channel is delivered to the transport channel multiplexing. These radio frames are serially multiplexed into a CCTrCH, designated as as $f_1, f_2, f_3, \ldots f_{Ndata}$.

Transport Format Combination Identifier (TFCI):

The size of the TFCI depends upon the number of TFCs needed. A smaller number of TFCs will yield a shorter TFCI in order to minimize the overhead over the radio interface. Preferably, the size of the TFCI is limited to a maximum of five bits, allowing a maximum of 32 different transport format combinations on the same physical channel. In other words, for a single connection (without reconfiguration), the preferred size limit for the TFCI would yield a maximum of 32 different channel coding and/or multiplexing possibilities at a time. For the coding of the TFCI, simple block codes may be used, as already employed for the stealing bits and the USF in 3GPP TS 45.003.

On GMSK full rate channels and 8-PSK half rate channels, the coding of the TFCI is preferably as follows:
1 bit TFCI is encoded to 8 bits
2 bits TFCI is encoded to 16 bits
3 bits TFCI is encoded to 24 bits
4 bits TFCI is encoded to 28 bits
5 bits TFCI is encoded to 36 bits On 8-PSK full rate channels, the coding of the TFCI is preferably obtained by repetition of the coding defined for GMSK full rate channels:
1 bit TFCI is encoded to 16 bits (2×8 bits)
2 bits TFCI is encoded to 32 bits (2×16 bits)
3 bits TFCI is encoded to 48 bits (2×24 bits)
4 bits TFCI is encoded to 56 bits (2×28 bits)
5 bits TFCI is encoded to 72 bits (2×36 bits)

On GMSK half rate channels, the coding of the TFCI is preferably obtained by using only the middle segment of the coding defined for GMSK full rate channels, as follows:
1 bit TFCI is encoded to 4 bits
2 bits TFCI is encoded to 8 bits
3 bits TFCI is encoded to 12 bits
4 bits TFCI is encoded to 16 bits 5 bits TFCI is encoded to 18 bits The coded TFCI is then preferably attached at the beginning of the CCTrCH before interleaving.

Interleaving:

The coded TFCI and the CCTrCH are interleaved together on bursts. The interleaving can be, for example, either diagonal or block rectangular, and is preferably configured at call set-up. The interleaving is based on the following equations:

for $k=0, 1, 2, \ldots K-1$ $b = k \bmod D$ if $\frac{K}{2} \bmod D = 0$, then $s = \text{int}\left[\frac{k}{K/2}\right]$ else $s=0$ $$j = \frac{D}{M} \times \left[(49 \times (k+s)) \bmod \frac{J}{D/M}\right] + \text{int}\left[\frac{k \bmod D}{M}\right]$$

where:

j is the position of the bit k within burst b;

D is the interleaving depth in bursts;

J is the burst size in bits;

K is the size of the radio packet in bits ($K=N_{radio}$)

M is the size of the radio packet in bursts (M=K/J).

On full rate GMSK channels, K=464 and J=116. On full rate 8-PSK channels, K=1392 and J=348. On half rate GMSK channels, K=232 and J=116. On half rate 8-PSK channels, K=696 and J=348.

For diagonal interleaving over 8 bursts (used on full rate channels), D=8. The result of interleaving is then a distribution of the re-ordered bits over eight bursts, using the even numbered position of the first four bursts and the odd numbered position of the last four bursts. For diagonal interleaving over four bursts (used on half rate channels), D=4, using the even numbered bits of the first two bursts and the odd numbered bits of the last two bursts. In order that the coding rate is similar between FR and HR channels, a radio packet on a HR channel is re-transmitted in the next consecutive block to achieve a diagonal interleaving depth of 6. The result of the interleaving is then a distribution of reordered bits over four bursts for each radio packet, each packet using the even numbered position of the first two bursts and the odd numbered position of the last two bursts. Thus the two consecutive radio packets together have a diagonal interleaving depth of D=6.

As shown by the shaded frames designated "F" in FIG. 4, a fast assisted control channel (FACCH) transmission on a FR channel (FACCH/F) has an interleaving depth of 8 bursts diagonal, the same as a TCH/F. The shaded frames designated "F" in FIG. 5 shows that a FACCH transmission on a half rate channel (FACCH/H) has an interleaving depth of 6 bursts, while a TCH/H has an interleaving depth of 4 bursts diagonal. It can be seen that both FACCH/F and FACCH/H use 8 half bursts for transmission and therefore have the same coding rate for very similar performance. Since all transport channels on a basic physical channel have the same interleaving depth, this poses a problem in handing off between a full rate channel and a half rate channel. As noted above, with FLO the interleaving depth is the same for all transport channels, including the one(s) configured for associated signaling. On HR channels, the interleaving block is configured to interleave each radio packet on 4 bursts in a diagonal manner.

In order to achieve a similar coding rate as on FR channels (in other words, in order to use 8 half bursts as on FR channels), the present invention sends the same transport block of the associated signaling twice, in two consecutive radio packets. The consecutive radio packets are soft combined in the receiver (mobile station or base station) for decoding. Since coded bits of the same transport block of associated signaling can be found in two consecutive radio packets, the effect is as if the interleaving depth was twice the interleaving used for one radio packet. This retransmission on HR channels is preferably mandatory at call set-up, rather than negotiated between the base station and the mobile station.

The above mechanism can be invisible to layer 2 (MAC). Only the layer 1 (physical layer) need have knowledge that the same transport block is sent in two consecutive radio packets, and it is at layer 1 that the same transport block is sent twice. The only indication at layer 2 is the possibility of a delay.

On the Transmit Side:

In the first radio packet the transport block of associated signaling is normally processed through FLO configured for HR channels. Coded bits of the associated signaling are diagonally interleaved over 4 bursts. In the second radio packet (which is the subsequent one), the same transport block of associated signaling is processed through FLO and the coded bits are diagonally interleaved over 4 bursts. The content of each radio packet is revealed by the TFCI. The TFCI of the two radio packets used to carry associated signaling is preferably the same, however different TFCIs can also be used to ease decoding.

On the Receive Side:

The first radio packet is received. Through the TFCI, the receiver knows that this first radio packet contains the coded bits of associated signaling. The receiver stores the soft values of the received coded bits and waits for the next (second) radio packet. In the second radio packet (the next consecutive one) the receiver knows by default that the same transport block of associated signaling is being carried. After combining the coded bits from the two radio packets, the receiver can decode the transport block of associated signaling.

Diversity:

In rate matching, coded bits are repeated or punctured as detailed above (3GPP TR 45.902). In order to improve the decoding performance, some diversity can be introduced: the repeated/punctured bits can be different between the two consecutive transmissions of the same transport block of associated signaling. This mechanism is known as incremental redundancy. There are various methods by which to introduce such diversity.

Figure 6:
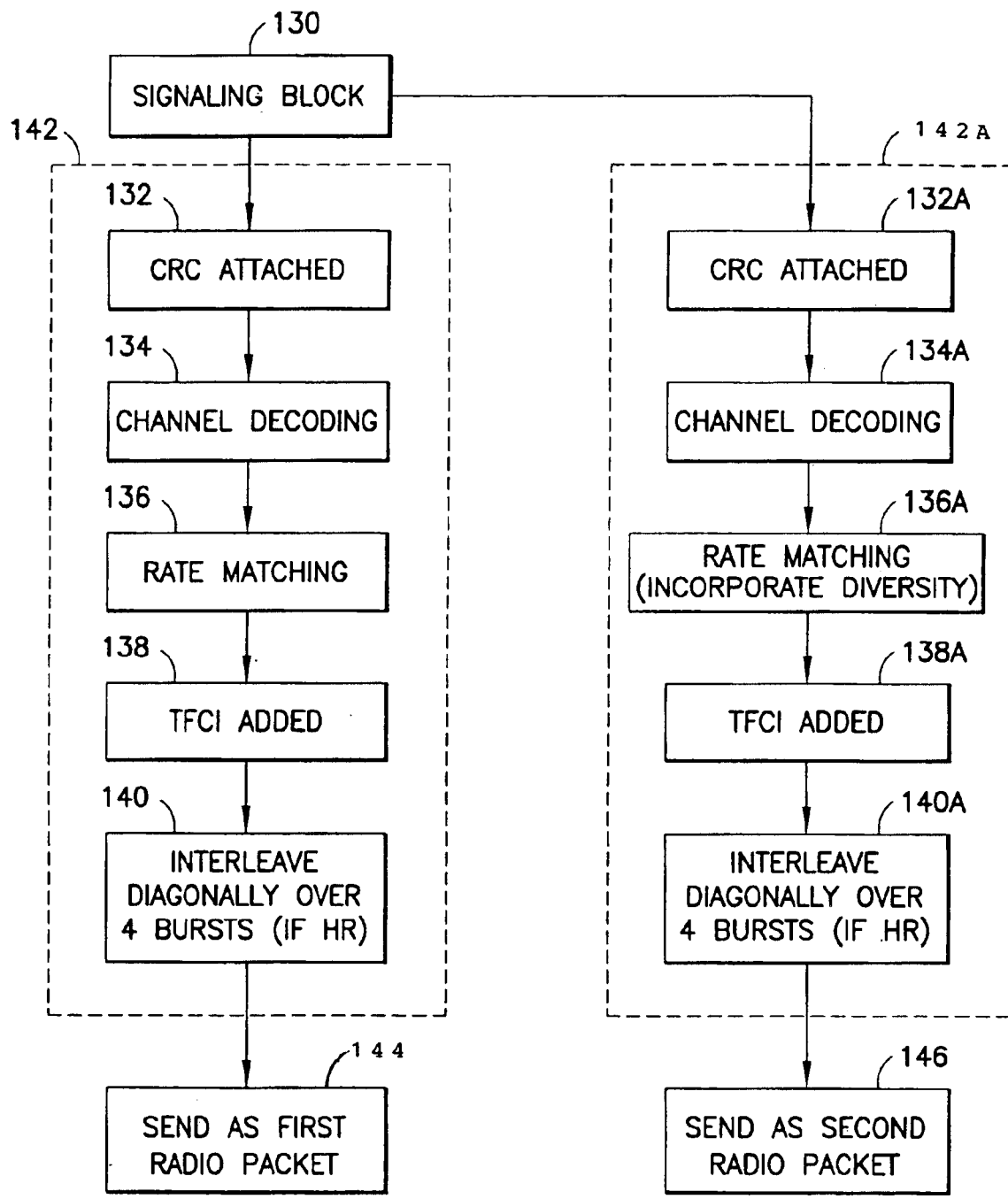
FIG. 6 is a block diagram depicting the transmit side of a communication in accordance with the preferred embodiment of the invention.

FIG. 6 depicts in block diagram the transmit side of a communication in accordance with the method of the present invention. At box 130, a signaling block is to be sent and is processed through the flexible layer one FLO, wherein the FLO is represented by box 142. It is noted that the blocks within box 142 are similar to those of the prior art FLO 124 of FIG. 3, assuring backward compatibility. The signaling block represents any bit stream prior to processing according to the FLO. A CRC is attached to the signaling block at box 132, and is particularly described under the previous subheading "CRC Attachment". Channel decoding is done at box 134 to produce encoded blocks that are then repeated or punctured in the rate matching block at box 136, and a TFCI is added at box 138. The encoded block, which now includes the CRC, signaling block, and TFCI, is interleaved over four bursts (if half rate channel) at box 140. The resulting interleaved block is sent as the first radio packet at block 144. The original signaling block 130 is processed in parallel a second time through the flexible layer one, box 142A. In that second processing of the same signaling block 130, the same CRC is attached 132A as was attached in the first processing at block 132, and channel coding is done again at block 134A. However, when rate matching is performed at box 136A, diversity may be added due to incremental redundancy. This may include different repeat or puncture bits as compared to rate matching used in block 136 where the first radio packet was built, as detailed above. Afterwards, the TFCI is added at box 138A, and interleaving is performed at box 140A as was done in the FLO 142 in building the first radio packet. This packet that results from processing the signaling block 130 a second time is sent as the second radio packet 146, which is the next packet sent after the first radio packet 144. The first and the second radio packets are diagonally interleaved over 6 bursts, as depicted in FIG. 5.

Figure 7:
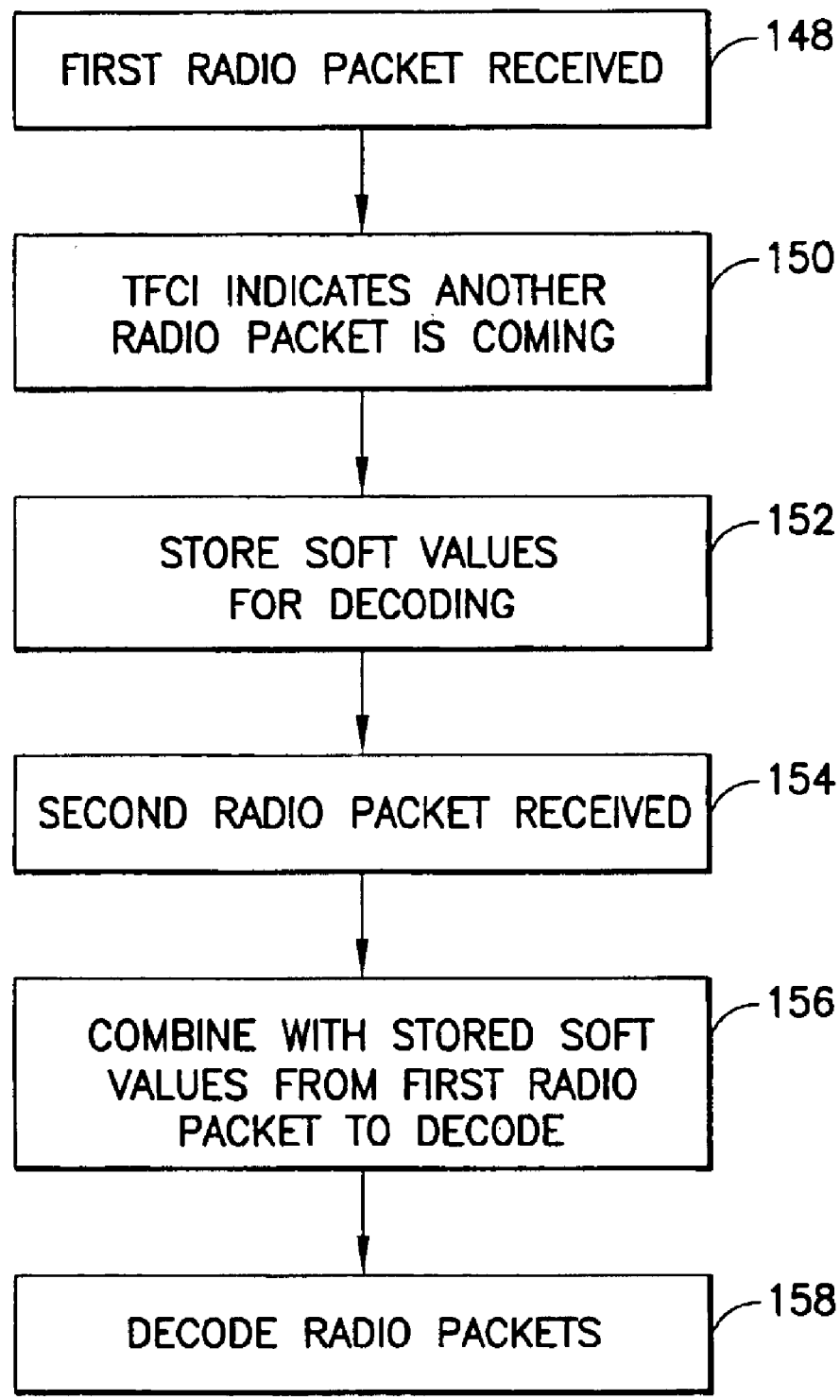
FIG. 7 is a block diagram depicting the receive side of a communication in accordance with the preferred embodiment of the invention.

FIG. 7 depicts in block diagram the receive side of the communication of FIG. 6. At the receiver, the first radio packet (block 144 of FIG. 6) is the first to arrive at box 148, since it is by definition the first sent. The TFCI of the first radio packet indicates that it is the first of two consecutive radio packets at box 150. This is because the receiver recognizes the size of the TFCI (as shown under the subheading Transport Format Combination Indicator TFCI), which is a given size for half rate transmissions given a particular modulation. The TFCI therefore alerts the receiver to store the soft values for decoding that are derived from the first radio packet, since another related radio packet is incoming with more decoding power. Decoding of the first radio packet will probably fail at this point anyway. Storing of these soft values is done at box 152. The second radio packet (block 146 of FIG. 5) is the next consecutive radio packet because it is interleaved with the first, as described above, and it is received at box 154. The decoding values that are derived from the second radio packet are combined at box 156 with those stored from the first radio packet, and the radio packets can be fully decoded at box 158. In the above manner, interleaving the first and second radio packets on a half rate channel, where each radio packet includes the same signaling block, enables the coding rate on a half rate channel to match that on a full rate channel.

Figure 8:
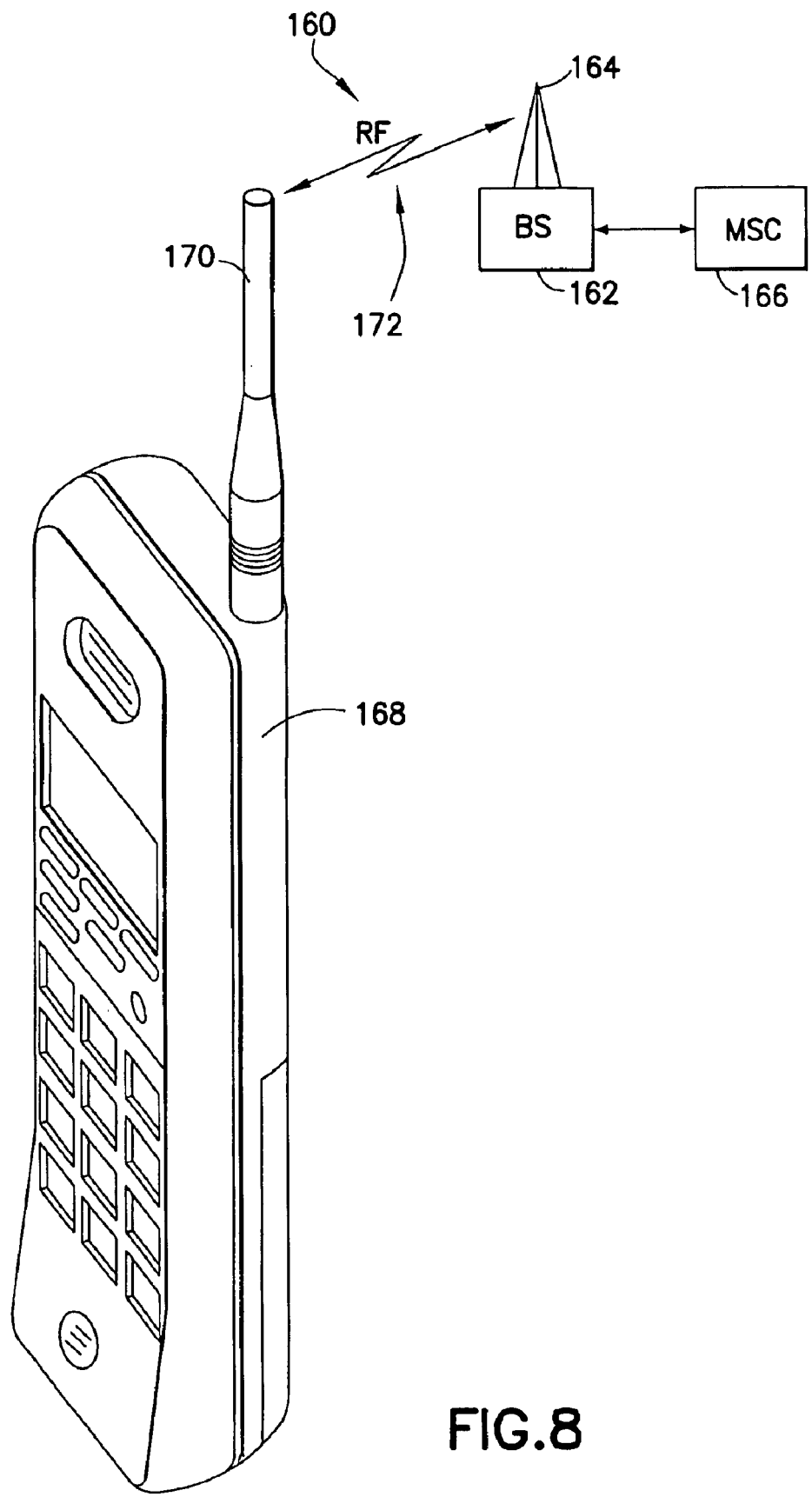
FIG. 8 is a perspective view of a wireless communication system in accordance with the present invention.

FIG. 8 is a perspective view of a wireless telecommunications system 160 according to the present invention. A base station 162 defines an antenna 164 and is electrically in contact with a mobile switching station 166 for communications beyond the wireless network. A mobile station 168 defines an antenna 170. RF transmissions 172 occur between the mobile station 168 and the base station 162 in both directions over various channels, for example, a full rate channel and a half rate channel. The RF transmissions 172 may include traffic data and signaling data, which may be interleaved over a plurality of bursts or blocks as is known in the art. Each of the mobile station 168 and the base station 162 comprise circuitry for transmitting and for receiving over the channels and for interleaving the data, as well as circuitry for soft combining electronic bits of the RF transmissions 172.

While described in the context of presently preferred embodiments, those skilled in the art should appreciate that various modifications of and alterations to the foregoing embodiments can be made, and that all such modifications and alterations remain within the scope of this invention. Examples herein are stipulated as illustrative and not exhaustive.

What is claimed is:
1. In a method for transmitting a signaling message between a base station and a mobile station over a half rate channel, where in the case of a full rate channel, traffic data and a signaling message are both interleaved over n bursts diagonally, and where in the case of a half rate channel, the traffic data is interleaved over k bursts diagonally, the improvement comprising:
   transmitting over k diagonally interleaved bursts on a half-rate channel an encoded signaling message in a first radio packet;
   consecutively transmitting over k diagonally interleaved bursts on the half-rate channel the encoded signaling message in a second radio packet,
   wherein the first and second radio packets are diagonally interleaved with one another over m bursts, wherein m is greater than k.
2. In the method of claim 1, the improvement further comprising n=8, m=6 and k=4.
3. In the method of claim 1, the improvement further comprising the first and second radio packet each comprising an identical Transport Format Combination Indicator.
4. In the method of claim 1, the improvement further comprising the first and second radio packet each comprising a different Transport Format Combination Indicator.
5. In the method of claim 1, the improvement further comprising the base station and mobile station each being compatible with a Flexible Layer One (FLO) GSM/EDGE air interface.
6. In the method of claim 1 wherein for a full rate channel, bits representing the traffic data and signaling message occupy even numbered bit positions for n/2 consecutive bursts and odd numbered bit positions for the remaining n/2 consecutive bursts, the improvement further comprising:
   each of the first and second radio packets use even bit positions for k/2 sequential bursts and odd bit positions for remaining k/2 sequential bursts.
7. In the method of claim 6, the improvement further comprising:
   each of the first and second radio packets using even bit positions for the same k/2 sequential bursts of their respective k bursts.
8. In the method of claim 1, the improvement further comprising the first and second radio packets each comprising at least one different rate matching coded bit.
9. In the method of claim 1, the improvement further comprising the at least one rate matching coded bit being one of a repeat bit and a puncture bit.
10. In the method of claim 1, the improvement further comprising the first and second radio packets each comprising an identical cyclic redundancy check block of bits.
11. In a wireless telecommunications system comprising circuitry for transmitting a signaling message between a base station and a mobile station over a half rate channel, where for a full rate channel traffic data and a signaling message are both interleaved over n bursts diagonally, and where for a half rate channel, the traffic data is interleaved over k bursts diagonally, the improvement comprising:
   a transmitter for transmitting on a half-rate channel an encoded signaling message in a first radio packet and in a consecutive second radio packet, where each of the first and second radio packets are interleaved over k bursts diagonally and the first and second radio packets are interleaved with one another over m>k bursts diagonally; and
   a receiver for receiving a first and a consecutive second radio packets said receiver having a decoder to deter- mine a first and second set of values for decoding the signaling message in the first and second radio packets respectively and to decode the signaling message using combined first and second values; and a memory for storing at least the first set of values.

12. A wireless telecommunications system as in claim 11, where n=8, m=6 and k=4.

13. A wireless telecommunications system as in claim 11, where each radio packet comprises an identical Transport Format Combination Indicator.

14. A wireless telecommunications system as in claim 11, where each radio packet comprises a different Transport Format Combination Indicator.

15. A wireless telecommunications system as in claim 11, where the base station and mobile station are compatible with a Flexible Layer One (FLO) GSM/EDGE air interface.

16. A method for decoding a signaling message within a radio packet, wherein the radio packet comprises a transport format combination identifier TFCI, comprising:

receiving a first radio packet over a physical channel at a half rate;

determining, based on the TFCI of the first radio packet, that a second radio packet with the signaling message has been sent;

determining and storing a first set of values for decoding the signaling message of the first radio packet;

receiving the second radio packet over the physical channel at a half rate, said second radio packet diagonally interleaved with the first radio packet;

determining a second set of values for decoding the signaling message of the second radio packet, combining the first and second set of values, and decoding the signaling message using the combined values.

17. The method of claim 16, where in the case that the first radio packet is modulated with 8-PSK modulation, determining that a second radio packet with the signaling message has been sent comprises determining that the TFCI of the first radio packet has one of:

1-bit encoded to 8 bits;

2-bits encoded to 16 bits;

3-bits encoded to 24 bits;

4-bits encoded to 28 bits; and 5-bits encoded to 36 bits.

18. The method of claim 16, where in the case that the first radio packet is modulated with GMSK modulation, determining that a second radio packet with the signaling message has been sent comprises determining that the TFCI of the first radio packet has one of:

1-bit encoded to 4 bits;

2-bits encoded to 8 bits;

3-bits encoded to 12 bits;

4-bits encoded to 16 bits; and 5-bits encoded to 18 bits.

19. The method of claim 16 wherein each of the first and second radio packets are interleaved over k bursts and diagonally interleaved with one another over more than k bursts and less than 2k bursts.

* * * * *